Dec. 27, 1966   E. B. SCHOTTHOEFER ETAL   3,294,141
SHAFT MOUNTING ADJUSTMENT NUT MEANS
Filed Oct. 20, 1965   2 Sheets-Sheet 1
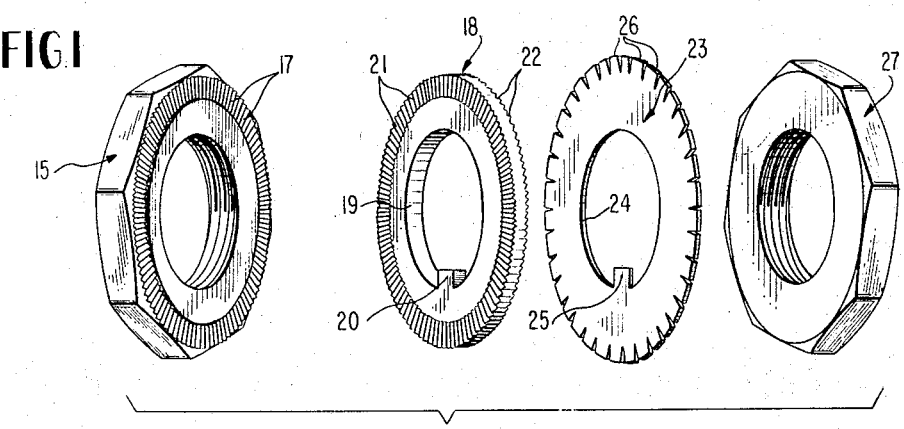
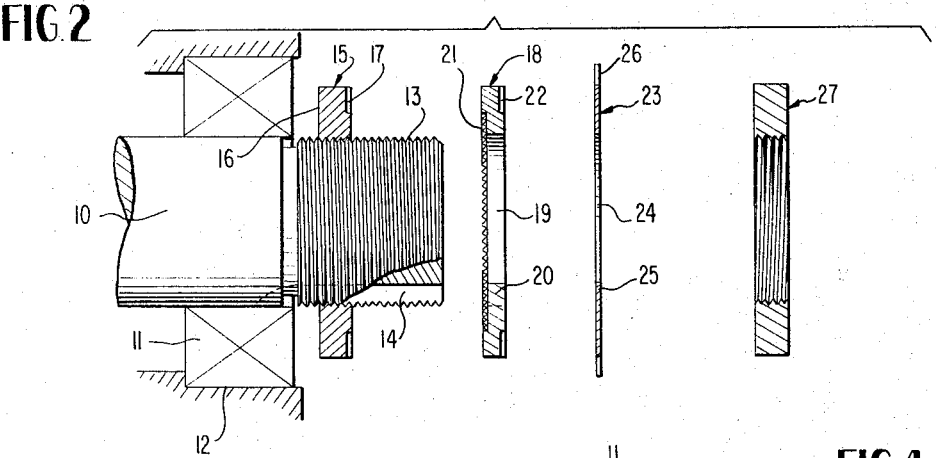
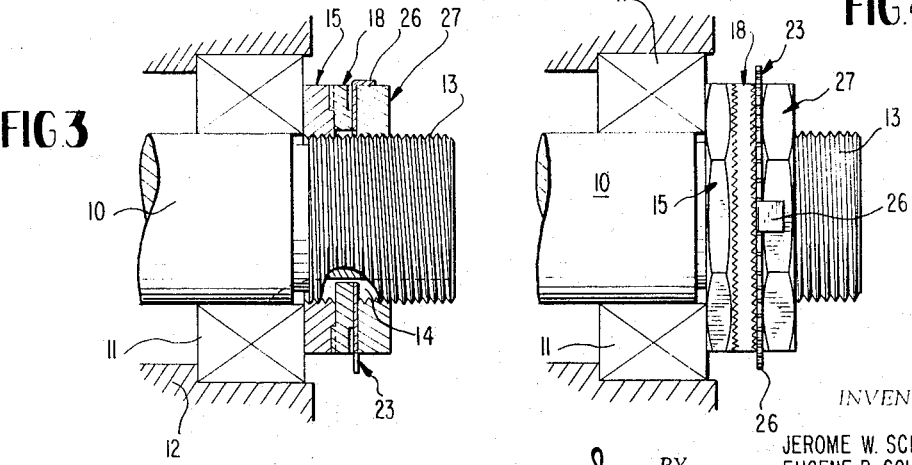
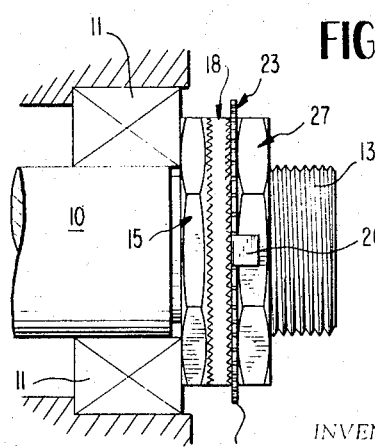
INVENTORS
JEROME W. SCHOTTHOEFER
EUGENE B. SCHOTTHOEFER
BY
ATTORNEY

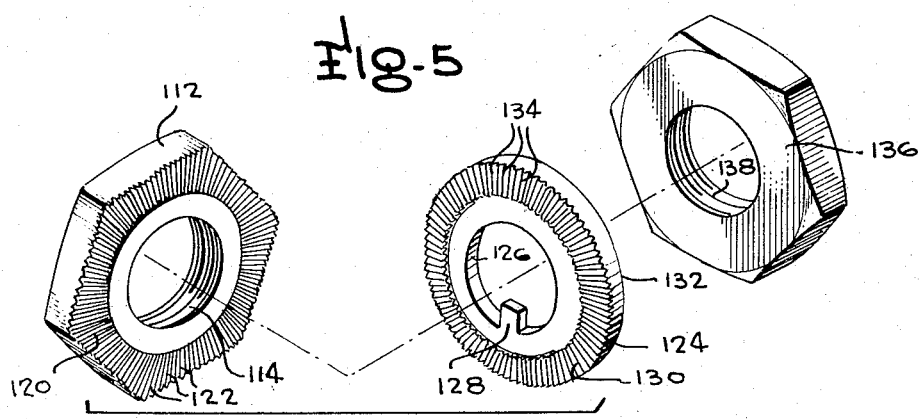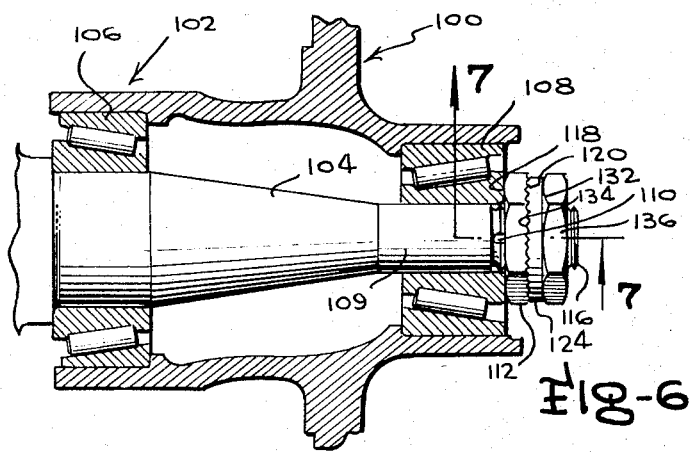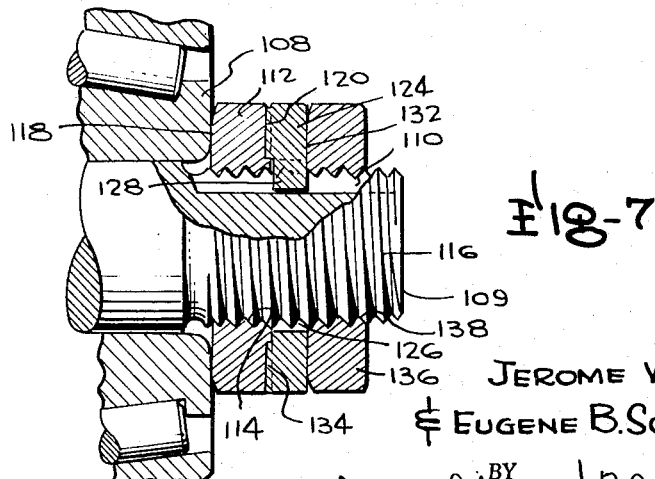

United States Patent Office 3,294,141
Patented Dec. 27, 1966

3,294,141
SHAFT MOUNTING ADJUSTMENT NUT MEANS
Eugene B. Schotthoefer and Jerome W. Schotthoefer,
both of 3520 Fergerson, Melvindale, Mich. 48127
Filed Oct. 20, 1965, Ser. No. 507,599
2 Claims. (Cl. 151—15)

This application is a continuation-in-part of our prior application Serial No. 359,176, filed April 13, 1964, now abandoned.

The present invention pertains to shaft mounting means including means for preloading and securing a bearing or similar element upon a shaft or the like.

This invention relates to a means for preloading and securing a bearing or the like upon a shaft or the like.

An object of the invention is to provide simplified assemblages of inexpensive parts which may be applied to, adjusted upon and securely locked to the screw-threaded extremity of a shaft, axle or the like for securing, adjusting or preloading bearings or like elements on the shaft.

Another object is to provide a device of the mentioned character which may have exceedingly fine adjustments on the shaft and which may be positively locked after adjustment thereon relative to a bearing or the like.

Still another object is to provide a device of the mentioned character including several parts which may be manufactured largely by stamping and coining operations with the very minimum of machining, thereby rendering the device highly economical to manufacture.

In the mounting of axle bearings on heavy duty equipment, such as truck axles, it is necessary that a nut or like positioning element be accurately adjusted lineally with respect to the wheel bearing in order to secure satisfactory operation. At present, it is conventional to employ for this purpose a first nut, an intermediate washer with bendable tabs thereon, and a second lock nut which is torqued against the washer after prepositioning of the first nut and washer. Following this procedure, the tabs of the washer are deformed about the respective nuts. To overcome difficulties of application involved in such procedure, and more importantly to increase the maintenance of accuracy of positioning of the first nut fllowing its initial positioning, this invention provides means to accomplish a locking of the assembly which is adapted to insure minimum displacement of the originally selected location of the nut.

Another objective of this invention is to provide a means as aforesaid which functions to effectively lock an element on a shaft without effecting any inclination of the element, whereby the element is maintained in substantially perpendicular relation to the shaft.

Other objects and advantages of the invention will be apparent during the course of the following detailed description.

In the accompanying drawings forming a part of this application:

FIGURE 1 is a perspective view of a first form of the invention means with the individual parts thereof separated from the shaft and from each other;

FIGURE 2 is an exploded central vertical longitudinal section through the form of the invention of FIGURE 1 and showing a portion of a shaft and a bearing upon which the invention may be utilized;

FIGURE 3 is a similar section showing the invention applied to the shaft and adjusted and locked thereon;

FIGURE 4 is a side elevational view of the invention as shown in FIGURE 3;

FIGURE 5 is a dissassambled perspective view of a second form of the invention;

FIGURE 6 is a sectional view of the second form of the invention in an environment of particular utility; and FIGURE 7 is an enlarged detail sectional view taken substantially on the section line 7—7 of FIGURE 6, looking in the direction of the arrows.

In the drawings, wherein for the purpose of illustration there are shown two preferred embodiments of the invention, and referring initially to FIGURE 1 through 4 inclusive, the numeral 10 therein designates a rotary shaft journaled within a conventional low friction bearing 11 mounted within a recess 12 of a housing or the like. The shaft has a screw-threaded end portion 13 having a longitudinal keyway 14 formed therein, as shown.

The first form of the invention to secure and/or preload the bearing 11 comprises an adjusting nut 15 having screw-threaded engagement with the shaft and having a substantially flat face 16 to engage the bearing or to be backed off slightly therefrom, as required. The opposite or outer face of the adjusting nut 15 has a multiplicity of closely circumferentially spaced radial serrations or teeth 17 formed therein accurately by a coining operation or the like. As will be explained, the serrations or teeth 17 facilitate minute adjustment of the nut 15 and the positive locking thereof with other elements of the shaft extremity 13. The nut 15 is preferably octagonal as shown but this is not a positive requirement.

Immediately outwardly of the nut 15 on the shaft extremity 13 is a locking disc or plate 18 having a smooth bore 19 engageable over the shaft extremity 13 and an inwardly projecting radial key 20 which enters the keyway 14 slidably. The locking disc 18 is essentially flat and thick enough to be rigid and preferably somewhat thinner than the nut 15, as shown. The disc 18 is provided on one side with serrations 21 which interfit or interlock in assembly with the like serrations 17 of the adjusting nut. The opposite side of the disc 18 may also be serrated in the same manner as at 22 for a similar purpose.

Outwardly of the locking disc 18, the first form of the invention comprises a thin flat lock washer 23 preferably formed of a relatively soft metal and having an opening 24 engageable freely over the shaft extension 13 and an inwardly projecting radial key 25 slidably engaging with the keyway 14 in assembly. The washer 23 is larger in diameter than disc 18 as shown, and is provided around its periphery with a plurality of circumferentially spaced radial slits forming a multiplicity of bendable locking tabs 26 or tongues for a purpose to be described. Before bending, these tabs 26 project radially beyond the disc 18 and nut 15, as shown. Radially inwardly of the tabs 26, one face of the washer 23 is adapted to engage the serrations 22 of locking disc 18 in assembly.

Immediately outwardly of the washer 23 on the shaft, and completing the assemblage of parts forming the first form of the invention is a jam nut 27, preferably of about the same thickness as the adjusting nut 15 and having screw-threaded engagement with the shaft extremity 13 as shown.

In the use of this form of the invention, the adjusting nut 15 is applied to the shaft and engaged with the bearing 11 to preload the same or backed off slightly therefrom, if desired. Next, the adjusting nut locking disc 18 is applied to the shaft and its serrations 21 are interengaged with the serrations 17 of the adjusting nut. Due to the number of minute serrations, the range of adjustment between the engaged elements 15 and 18 is very minute. The key 20 positively locks the disc 18 against turning on the shaft and the interfitting serrations 21 and 17 prevent relative rotation between the adjusting nut 15 and locking disc 18, once the assembly has been suitably tightened.

The washer 23 is installed upon the shaft and the jam nut 27 is installed and tightened securely to lock the elements 15 and 18 positively in the selected adjusted position. When the jam nut 27 is tightened, the other elements cannot turn because of their keyed connection with the shaft. Tightening of the nut 27 will also cause the outer serrations 22 to bite into the washer 23, although this is an optional feature of the invention not essential to its successful operation. After final tightening, one or more of the tabs 26 are bent over one or more of the lands of the jab nut 27 to positively lock the same against turning, as shown in FIGURES 3 and 4.

In FIGURES 5 through 7, a second form of the invention is disclosed in an environment of use wherein particular utility is present. Briefly described, this environment is the bell housing 100 of an axle assembly 102. A shaft 104 extends through the housing, and has tapered bearings 106, 108 thereon about its reduced end 109 within the housing. The shaft has a longitudinal keyway 110 formed therein for a purpose described below. To maintain the bearing in place during operation, an adjusting nut 112 forming a part of the second form of the invention is supplied.

The nut 112 has a threaded bore 114 for engagement with threads 116 on the shaft end 109. The nut 112 further has a substantially flat, smooth inner face 118 disposed in the direction of the bearings, and an opposite face 120 thereof has a plurality of continuous, closely circumferentially spaced radial serrations or teeth 122 projecting outwardly thereof and formed therein by a coining operation or the like.

A locking disc or plate 124 is disposed about the shaft 104 immediately outward of the nut 112, and has a smooth bore 126 of a diameter such that it is slidable over the shaft. An inwardly projecting substantially rectangular key 128 projects from the plate and is slidably positioned within the keyway 110. The disc 124 has opposite faces 130, 132, and the face 130, which is adjacent the adjustment nut face 120, has a plurality of continuous closely spaced serrations 134 therein which interfit or interlock with the corresponding serrations 122 of the nut face. The opposite side face 132 is smooth in this form of the invention.

At this point, it will be observed that, upon selection of the linear position of the nut 112 with respect to the bearings and interengagement of the nut and plate serrations, any appreciable change in the linear movement of the nut is precluded due to the interengagement of the serrations and the engagement of the plate key 128 in the shaft keyway 110. Assuming relatively close tolerances in the key-keyway combination and correspondingly close spacing of the serrations, change in pre-setting of the nut location is virtually eliminated.

The assembly of the second form of the invention is completed by a jam nut 136 with a threaded bore 138 engaged on the shaft and arranged thereon to force the plate 124 against the adjustment nut 112. The provision of continuous interengagement means about the full periphery of the plate and the nut, taken with the application of substantially uniform circumferential force thereto by reason of the jam nut 136 maintains the vertical displacement of the adjustment nut with respect to the bearings and prevents any canting or deviation from the perpendicular thereof.

It is to be understood that the forms of the invention herewith shown and described are to be taken as preferred examples of the same, and that various changes in the size, shape and arrangement of parts may be resorted to, without departing from the spirit of the invention or scope of the appended claims.

What is claimed is:

1. The combination, with a bearing mounted on a shaft at a selected location, the shaft being threaded and having a keyway interrupting the threads and extending along one side thereof, of a shaft mounting means comprising:
   an adjustment nut having a screw threaded engagement with the shaft and having inner and outer faces;
   the inner face of the adjusting nut being located adjacent the bearing;
   the outer face of the adjusting nut having a continuous multiplicity of circumferentially spaced, radial serrations therein;
   an annular locking disc having a smooth bore engageable over the shaft and having a key engaging within the keyway thereof and positively locking the adjustment nut against turning;
   the disc being provided with inner and outer faces, the inner face being arranged adjacent the outer face of the adjusting nut, and the inner face having a circumferential, continuous multiplicity of serrations like the nut serrations and interengaged adjustably therewith to positively locate the nut with respect to the disc and lock the nut against rotation after said interengagement;
   a jam nut on the shaft having screw threaded engagement therewith and engaging the disc and being tightened thereagainst to positively locate the disc with respect to the adjustment nut whereby the selected positioning of the adjustment assembly is positively maintained; and
   a lock washer interposed between the disc and the jam nut, the lock washer having a key engaging within the keyway and having bendable tabs on its periphery extending radially beyond the disc and bendable about the disc and the jam nut.

2. The invention of claim 1, and:
   a further multiplicity of serrations on the outer side of the disc.

References Cited by the Examiner

UNITED STATES PATENTS

| 338,729 | 3/1886 | Fuller | 151—53 |
| 606,328 | 6/1898 | Binn | 151—16 |
| 887,574 | 5/1908 | Barr | 151—15 |
| 955,054 | 4/1910 | Darby et al. | 151—17 |
| 1,048,811 | 12/1912 | Dean | 151—46 |
| 1,216,586 | 2/1917 | McLeod | 151—15 |
| 2,649,337 | 8/1953 | Ware | 308—236 |

FOREIGN PATENTS

| 1,252,547 | 12/1960 | France. |
| 414,371 | 7/1934 | Great Britain. |

CARL W. TOMLIN, *Primary Examiner.*

M. PARSONS, JR., *Assistant Examiner.*